US012766348B2

(12) United States Patent
Jacob et al.

(10) Patent No.: US 12,766,348 B2
(45) Date of Patent: Oct. 20, 2026

(54) SELF-RETRACTING DEVICE AND AXLE THEREFOR

(71) Applicant: MSA Technology, LLC, Cranberry Township, PA (US)

(72) Inventors: Matthew Frederick Jacob, Pittsburgh, PA (US); Michael Goodspeed, Pittsburgh, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 1211 days.

(21) Appl. No.: 17/488,495

(22) Filed: Sep. 29, 2021

(65) Prior Publication Data

US 2022/0105374 A1 Apr. 7, 2022

Related U.S. Application Data

(60) Provisional application No. 63/086,920, filed on Oct. 2, 2020.

(51) Int. Cl.
*A62B 35/00* (2006.01)
*B65H 75/40* (2006.01)
(Continued)

(52) U.S. Cl.
CPC ......... *A62B 35/0093* (2013.01); *B65H 75/40* (2013.01); *B65H 75/4442* (2013.01); *B65H 75/486* (2013.01)

(58) Field of Classification Search
CPC ............................ A62B 35/0093; B65H 75/40
See application file for complete search history.

(56) References Cited

U.S. PATENT DOCUMENTS 2,896,912 A * 7/1959 Faugier .............. A62B 35/0093 188/185
4,726,538 A 2/1988 Kovacik et al.
(Continued)

FOREIGN PATENT DOCUMENTS

CN 204601426 9/2015
CN 207071172 3/2018
(Continued)

OTHER PUBLICATIONS

European Patent Office, Appl. 21876452, European Search Report, Oct. 8, 2024.

(Continued)

*Primary Examiner* — Brian D Mattei
*Assistant Examiner* — Kathleen M. McFarland
(74) *Attorney, Agent, or Firm* — Jones Day

(57) ABSTRACT

A self-retracting device includes a housing assembly having a first housing cover removably connectable to a second housing cover. The self-retracting device further includes a rotatable hub received within an interior of the housing assembly and having a line associated therewith, and retraction member received within an interior of the housing assembly between the rotatable hub and the first housing cover. The self-retracting device further includes an axle having a first end fixedly but removably connected to the first housing cover, a body extending through the retraction member and the rotatable hub, and a second end in engagement with at least a portion of the rotatable hub.

21 Claims, 7 Drawing Sheets

(51) Int. Cl.
*B65H 75/44* (2006.01)
*B65H 75/48* (2006.01)

(56) References Cited

U.S. PATENT DOCUMENTS 5,074,483 A * 12/1991 Wang ........................ B66D 1/02 242/376
5,186,289 A 2/1993 Wolner et al.
5,771,993 A 6/1998 Anderson et al.
6,092,623 A 7/2000 Collavino
6,804,830 B2 10/2004 Reynolds et al.
7,237,650 B2 7/2007 Casebolt
7,281,620 B2 10/2007 Wolner et al.
7,744,063 B2 6/2010 Jones
7,815,013 B2 10/2010 Griffith
7,870,934 B2 1/2011 Ecker
7,946,387 B2 5/2011 Betcher et al.
8,052,080 B2 11/2011 Liang
8,181,744 B2 5/2012 Parker et al.
8,191,815 B2 6/2012 Huang
8,226,024 B2 7/2012 Meillet
8,256,574 B2 9/2012 Griffiths et al.
8,292,028 B2 10/2012 Wise
8,430,206 B2 4/2013 Griffiths et al.
8,430,207 B2 4/2013 Griffiths et al.
8,490,750 B2 * 7/2013 Balquist ............. A62B 35/0093 182/236
8,511,434 B2 8/2013 Blomberg
8,528,694 B2 9/2013 Meillet et al.
8,550,225 B2 10/2013 Blomberg et al.
8,567,562 B2 10/2013 Meillet et al.
8,701,833 B2 4/2014 Marquardt et al.
8,739,929 B2 6/2014 Meillet et al.
8,757,532 B2 6/2014 Votel et al.
8,800,715 B2 8/2014 Olson et al.
8,800,719 B2 8/2014 Auston et al.
8,893,854 B2 11/2014 Casebolt
8,925,687 B2 1/2015 Meillet et al.
8,931,593 B2 1/2015 Harris, Jr.
8,950,551 B2 2/2015 Jones et al.
8,991,556 B2 3/2015 Auston et al.
9,056,753 B2 6/2015 Luntz et al.
9,121,462 B2 9/2015 Casebolt
9,199,103 B2 12/2015 Hetrich et al.
9,242,128 B2 1/2016 Macy
9,272,168 B2 3/2016 Parker et al.
9,283,412 B2 3/2016 Myer
9,320,925 B2 4/2016 Wise
9,480,865 B2 11/2016 Naylor et al.
9,498,660 B2 11/2016 Moine et al.
9,643,034 B2 5/2017 Wise
9,670,980 B2 6/2017 Jones et al.
9,827,451 B2 11/2017 Renton et al.
9,913,999 B2 3/2018 Balquist et al.
10,004,927 B2 6/2018 Choate et al.
10,016,638 B2 7/2018 Casebolt et al.
10,029,128 B2 7/2018 Lin
10,125,837 B1 11/2018 Fegley et al.
10,149,991 B2 12/2018 Schurian et al.
10,159,859 B2 12/2018 Wu
10,207,128 B2 2/2019 Hetrich
10,279,205 B2 5/2019 Hung
10,322,305 B2 6/2019 Balquist et al.
10,322,306 B2 6/2019 Jones et al.
10,343,001 B2 7/2019 Seman
10,412,934 B2 9/2019 Max et al.
10,413,761 B2 9/2019 Hetrich
10,456,609 B2 10/2019 Yang et al.
10,478,646 B2 11/2019 Sun
10,512,802 B2 12/2019 Patton et al.
10,532,234 B2 1/2020 Hsu
10,537,758 B2 1/2020 Comet
10,576,310 B2 3/2020 Hung
10,653,903 B2 5/2020 Jones et al.
10,661,103 B2 5/2020 Griffiths et al.
10,661,106 B2 5/2020 Choate et al.
10,688,323 B2 6/2020 Wolner et al.
10,695,595 B2 6/2020 Grant
10,702,723 B2 7/2020 Quigley et al.
10,744,354 B2 8/2020 Choate et al.
10,765,895 B2 9/2020 Wang et al.
10,792,523 B2 10/2020 Casebolt
10,799,731 B2 10/2020 Jacob et al.
10,814,149 B2 10/2020 Liggett et al.
10,816,054 B2 10/2020 Patton et al.
10,874,886 B2 12/2020 Bertoti et al.
10,960,243 B2 3/2021 Chen et al.
10,987,528 B2 4/2021 Wang et al.
11,009,089 B2 5/2021 Allington et al.
11,033,003 B1 6/2021 Burkhardt
11,090,517 B2 8/2021 Hung et al.
11,255,060 B2 2/2022 Lanter
11,286,143 B2 3/2022 Lepoutre et al.
11,504,557 B2 11/2022 Boraas et al.
11,633,632 B2 4/2023 Carlson et al.
2003/0145803 A1 8/2003 Muller
2004/0262080 A1 12/2004 Reynolds et al.
2005/0051659 A1 3/2005 Wolner et al.
2005/0217937 A1 10/2005 Rohlf
2006/0021825 A1 2/2006 An et al.
2006/0163000 A1 7/2006 Chowthi
2007/0068731 A1 3/2007 Griffith
2007/0157892 A1 7/2007 Farrell et al.
2008/0011895 A1 1/2008 Bleshoy
2008/0257278 A1 10/2008 Simpson et al.
2009/0078505 A1 3/2009 Casebolt et al.
2009/0178887 A1 7/2009 Reeves et al.
2009/0260922 A1 10/2009 Marquardt et al.
2010/0116922 A1 5/2010 Choate et al.
2010/0224448 A1 * 9/2010 Wolner .................... A62B 1/10 182/234
2010/0236867 A1 9/2010 Jones et al.
2011/0059325 A1 3/2011 Juan et al.
2011/0315482 A1 12/2011 Griffiths et al.
2011/0315483 A1 12/2011 Griffiths et al.
2012/0024640 A1 2/2012 Argoud
2012/0103724 A1 5/2012 Reynolds et al.
2012/0205478 A1 8/2012 Balquist et al.
2013/0008392 A1 1/2013 Holmstrom
2013/0020149 A1 1/2013 Wise
2013/0056302 A1 3/2013 Bishop
2013/0105246 A1 5/2013 Schlangen et al.
2013/0105247 A1 5/2013 Casebolt
2013/0200197 A1 8/2013 Bogdahn et al.
2013/0233648 A1 9/2013 Smit
2013/0248291 A1 9/2013 Jones et al.
2013/0292219 A1 11/2013 Perner
2014/0190770 A1 7/2014 Renton et al.
2015/0231424 A1 8/2015 Kim
2016/0016023 A1 1/2016 Myer
2016/0096048 A1 4/2016 Fegley et al.
2016/0367844 A1 12/2016 Yang et al.
2017/0142935 A1 5/2017 Max et al.
2017/0252591 A1 * 9/2017 Hetrich .................... A62B 1/12
2017/0295755 A1 10/2017 Hill
2017/0368386 A1 12/2017 Wu
2017/0368387 A1 12/2017 Fife et al.
2018/0015312 A1 1/2018 Jones et al.
2018/0107169 A1 4/2018 Hu et al.
2018/0161608 A1 6/2018 Choate et al.
2018/0178044 A1 6/2018 Hetrich
2018/0289987 A1 10/2018 Hung
2018/0333598 A1 11/2018 Hung
2018/0345049 A1 12/2018 Hung et al.
2019/0030381 A1 1/2019 Hung
2019/0070444 A1 3/2019 Seman
2019/0076679 A1 3/2019 Auston et al.
2019/0083826 A1 3/2019 Sun
2019/0126079 A1 5/2019 Svoboda et al.
2019/0134438 A1 5/2019 Liggett et al.
2019/0143159 A1 5/2019 Grant
2019/0209877 A1 7/2019 Farrell
2019/0217134 A1 7/2019 Green Mullins
2019/0247683 A1 8/2019 Farrell

(56) References Cited

U.S. PATENT DOCUMENTS

| | | | |
|---|---|---|---|
| 2019/0275356 | A1 | 9/2019 | Jones et al. |
| 2019/0308041 | A1 | 10/2019 | Harding et al. |
| 2019/0314656 | A1 | 10/2019 | Farrell et al. |
| 2019/0321665 | A1 | 10/2019 | Huseth et al. |
| 2020/0023211 | A1 | 1/2020 | Chang |
| 2020/0078617 | A1 | 3/2020 | Wang et al. |
| 2020/0078619 | A1 | 3/2020 | Wang et al. |
| 2020/0078621 | A1 | 3/2020 | Chen et al. |
| 2020/0129792 | A1 | 4/2020 | Fegley et al. |
| 2020/0206550 | A1 | 7/2020 | Blackford et al. |
| 2020/0222732 | A1 | 7/2020 | Rutkowski et al. |
| 2020/0276462 | A1 | 9/2020 | Bornack |
| 2020/0360740 | A1 | 11/2020 | Jones et al. |
| 2020/0361743 | A1 | 11/2020 | Castaneda |
| 2020/0376342 | A1 | 12/2020 | Mumford |
| 2020/0406073 | A1 | 12/2020 | Liao et al. |
| 2020/0406074 | A1 | 12/2020 | Fjelldal |
| 2021/0069052 | A1 | 3/2021 | Burke |
| 2021/0077840 | A1 | 3/2021 | Boraas et al. |
| 2021/0113865 | A1 | 4/2021 | Thompson |
| 2021/0308502 | A1 | 10/2021 | Blackford et al. |
| 2022/0105374 | A1 | 4/2022 | Jacob et al. |
| 2022/0161071 | A1 | 5/2022 | Hung et al. |
| 2022/0161072 | A1 | 5/2022 | Hung et al. |
| 2022/0161073 | A1 | 5/2022 | Thompson |
| 2022/0176173 | A1 | 6/2022 | Lopez |
| 2022/0203143 | A1 | 6/2022 | Blackford et al. |
| 2022/0212906 | A1 | 7/2022 | Massicotte |
| 2022/0234868 | A1 | 7/2022 | Feng |
| 2022/0249888 | A1 | 8/2022 | Pollard et al. |
| 2022/0266075 | A1 | 8/2022 | Lepp et al. |
| 2022/0273972 | A1 | 9/2022 | Hung et al. |
| 2022/0339477 | A1 | 10/2022 | Tushaus |
| 2022/0355134 | A1 | 11/2022 | McLeod et al. |
| 2022/0362592 | A1 | 11/2022 | Clark et al. |
| 2022/0362594 | A1 | 11/2022 | Coyle et al. |
| 2022/0401765 | A1 | 12/2022 | Rodriguez |

FOREIGN PATENT DOCUMENTS

| | | |
|---|---|---|
| CN | 207185606 | 4/2018 |
| CN | 207186953 | 4/2018 |
| CN | 207370992 | 5/2018 |
| CN | 108721800 | 11/2018 |
| CN | 208097151 | 11/2018 |
| CN | 208660182 | 3/2019 |
| CN | 109550168 | 4/2019 |
| CN | 208726579 | 4/2019 |
| CN | 208865075 | 5/2019 |
| CN | 208911326 | 5/2019 |
| CN | 209221365 | 8/2019 |
| CN | 209253979 | 8/2019 |
| CN | 209464511 | 10/2019 |
| CN | 209529938 | 10/2019 |
| CN | 209564532 | 11/2019 |
| CN | 209575555 | 11/2019 |
| CN | 110538395 | 12/2019 |
| CN | 209714048 | 12/2019 |
| CN | 209714051 | 12/2019 |
| CN | 209799441 | 12/2019 |
| CN | 210002930 | 1/2020 |
| CN | 210020908 | 2/2020 |
| CN | 210205654 | 3/2020 |
| CN | 210331417 | 4/2020 |
| CN | 210331421 | 4/2020 |
| CN | 111110271 | 5/2020 |
| CN | 210472829 | 5/2020 |
| CN | 210472831 | 5/2020 |
| CN | 210644887 | 6/2020 |
| CN | 210698552 | 6/2020 |
| CN | 210786035 | 6/2020 |
| CN | 210786041 | 6/2020 |
| CN | 111388903 | 7/2020 |
| CN | 211301831 | 8/2020 |
| CN | 211357501 | 8/2020 |
| CN | 211357502 | 8/2020 |
| CN | 211357512 | 8/2020 |
| CN | 211611381 | 10/2020 |
| CN | 211644444 | 10/2020 |
| CN | 211675957 | 10/2020 |
| CN | 211751942 | 10/2020 |
| CN | 111921122 | 11/2020 |
| CN | 111939496 | 11/2020 |
| CN | 111956967 | 11/2020 |
| CN | 212016494 | 11/2020 |
| CN | 112169209 | 1/2021 |
| CN | 212327235 | 1/2021 |
| CN | 212347492 | 1/2021 |
| CN | 212522778 | 2/2021 |
| CZ | 2244790 | 10/2020 |
| CZ | 2653195 | 1/2021 |
| DE | 202015100584 | 2/2015 |
| DE | 202015103288 | 7/2015 |
| DE | 202016103416 | 7/2016 |
| EP | 0687482 | 12/1995 |
| EP | 1545713 | 6/2005 |
| EP | 2687268 | 1/2014 |
| EP | 3002044 | 4/2016 |
| EP | 3550176 | 10/2019 |
| EP | 3574958 | 12/2019 |
| EP | 3797836 | 3/2021 |
| EP | 3797839 | 3/2021 |
| FR | 2952543 | 5/2011 |
| FR | 3057170 | 4/2018 |
| GB | 2306107 | 4/1997 |
| GB | 2481403 | 9/2013 |
| GB | 2543366 | 4/2017 |
| GB | 2561849 | 10/2018 |
| GB | 2562593 | 11/2018 |
| JP | 6554684 | 8/2019 |
| JP | 6625958 | 12/2019 |
| JP | 6628713 | 1/2020 |
| JP | 6808518 | 1/2021 |
| KR | 102159741 | 9/2020 |
| KR | 102233281 | 3/2021 |
| NZ | 758776 | 5/2020 |
| TW | M360706 | 7/2009 |
| TW | M390152 | 10/2010 |
| TW | M421128 | 1/2012 |
| TW | M512643 | 11/2015 |
| TW | M544337 | 7/2017 |
| TW | M554490 | 1/2018 |
| TW | 201902538 | 1/2019 |
| TW | M572764 | 1/2019 |
| TW | M572765 | 1/2019 |
| TW | M572766 | 1/2019 |
| TW | M572767 | 1/2019 |
| TW | M572768 | 1/2019 |
| TW | I674125 | 10/2019 |
| TW | M586154 | 11/2019 |
| TW | M607551 | 2/2021 |
| WO | WO 2004/067095 | 8/2004 |
| WO | WO 2007/057636 | 5/2007 |
| WO | WO 2010/081202 | 7/2010 |
| WO | WO 2013/061088 | 5/2013 |
| WO | WO 2017/072435 | 5/2017 |
| WO | WO 2017/072436 | 5/2017 |
| WO | WO 2017/072437 | 5/2017 |
| WO | WO 2017/078669 | 5/2017 |
| WO | WO 2018/056852 | 3/2018 |
| WO | WO 2018/201254 | 11/2018 |
| WO | WO 2019/175543 | 9/2019 |
| WO | WO 2020/151713 | 7/2020 |
| WO | WO 2020/151715 | 7/2020 |
| WO | WO 2020/160665 | 8/2020 |
| WO | WO 2020/201700 | 10/2020 |
| WO | WO 2021/044163 | 3/2021 |
| WO | WO 2021/084383 | 5/2021 |
| WO | WO 2022/003500 | 1/2022 |
| WO | WO 2022/003501 | 1/2022 |
| WO | WO 2022/009175 | 1/2022 |

(56) References Cited

OTHER PUBLICATIONS

Patent Cooperation Treaty, PCT/US2022/021850, International Search Report and Written Opinion of the International Searching Authority, dated Jul. 7, 2022.

* cited by examiner

SELF-RETRACTING DEVICE AND AXLE THEREFOR

CROSS-REFERENCE TO RELATED APPLICATION

This application claims priority to U.S. Provisional Patent Application No. 63/086,920, filed Oct. 2, 2020, the disclosure of which is hereby incorporated by reference in its entirety.

TECHNICAL BACKGROUND

Technical Field

The present disclosure is generally directed to safety systems and arrangements and, in particular, to a self-retracting device, such as a fall arrest or controlled descent device, including self-retracting lanyards and the like, which may be used in connection with a harness to protect the wearer from a sudden, accelerated fall arrest event, as well as a self-retracting device having a an axle.

Technical Considerations

Self-retracting devices may be used in a variety of situations and applications. For example, one type of a self-retracting device is in the form of a retractable lanyard, such as a self-retracting lanyard (SRL), which is commonly used for fall protection in industrial environments, as well as in connection with recreational activities. SRLs have numerous industrial end uses, including, but not limited to, construction, manufacturing, hazardous materials/remediation, asbestos abatement, spray painting, sand blasting, welding, mining, numerous oil and gas industry applications, electric and utility, nuclear energy, paper and pulp, sanding, grinding, stage rigging, roofing, scaffolding, telecommunications, automotive repair and assembly, warehousing, and railroading.

SRLs frequently include a housing that includes a rotatable drum or a hub around which a line, typically made of webbing, cable, rope, and/or synthetic material, is wound. The hub rotates to unwind (or "pay out") the line from its housing when a certain level of tension is purposefully applied. When tension is reduced or released, the hub can slowly rotate in a reverse direction via a retraction mechanism, causing the line to retract or rewind about the drum or hub. The retraction mechanism may include a power spring which is energized when the line is paid out from the housing and is de-energized to retract the line into the housing. Certain SRLs may further include a braking mechanism or assembly for resisting hub rotation when an inelastic line (e.g., a steel cable) unwinds too rapidly, i.e., faster than its predetermined maximum velocity for normal payout. A sudden line payout may be an indication that the lanyard wearer/user has experienced a fall that needs to be stopped or arrested.

The drum of the SRL rotates around an axle positioned at a center of rotation of the drum. The axle is typically made of metal and may be keyed with one or more components of the SRL. Conventional axles often have complex geometries that require expensive and time-consuming manufacturing steps. Furthermore, conventional axles do not capture the retraction mechanism during assembly and inspection of the SRL, such as when at least a portion of an outer cover is removed, in a manner that prevents dangerous unwinding of the power spring of the retraction mechanism. Therefore, there is a need in the art to provide an improved self-retracting device having an improved axle.

SUMMARY OF THE DISCLOSURE

Accordingly and generally, in some non-limiting embodiments or aspects of the present disclosure, provided is a self-retracting device having an improved axle.

In accordance with some non-limiting embodiments or aspects of the present disclosure, provided is a self-retracting device that may have a housing assembly including a first housing cover removably connectable to a second housing cover, a rotatable hub received within an interior of the housing assembly and having a line associated therewith, a retraction member received within an interior of the housing assembly between the rotatable hub and the first housing cover, and an axle having a first end fixedly but removably connected to the first housing cover, a body extending through the retraction member and the rotatable hub, and a second end received in engagement with at least a portion of the rotatable hub.

In accordance with some non-limiting embodiments or aspects of the present disclosure, the axle may have first threads at the first end configured for threadably engaging with second threads on the first housing cover. The second threads may be defined on an insert non-removably connected to the first housing cover. The second end of the axle may have a bolt head configured for interfacing with a fastening tool. The first end and the second end of the axle may be contained within the interior of the housing assembly when the first housing cover is connected to the second housing cover. The second end of the axle may be received within a pocket of the second housing cover when the second housing cover is connected to the first housing cover.

In accordance with some non-limiting embodiments or aspects of the present disclosure, the first housing cover may be removably connectable to the second housing cover by one or more fasteners, clips, adhesive, or any combination thereof. The line may have a first end directly or indirectly attached to the rotatable hub and a second end opposite the first end and extending out of the housing assembly.

In accordance with some non-limiting embodiments or aspects of the present disclosure, the retraction member may bias the rotatable hub in a first rotational direction. The rotatable hub may be configured to: (i) retract the line into the interior of the housing assembly by winding the line onto the rotatable hub when the rotatable hub moves in the first rotational direction; and (ii) pay out the line from the interior of the housing by unwinding from the rotatable hub when the rotatable hub moves in a second rotational direction opposite the first rotational direction. The retraction member may be a power spring. The power spring may include a first end fixed relative to the housing assembly and a second end secured directly or indirectly to the rotatable hub.

In accordance with some non-limiting embodiments or aspects of the present disclosure, a brake assembly may be configured to prevent rotation of the rotatable hub upon activation of the brake assembly. The brake assembly may include a speed-sensitive mechanism having an activated position and a non-activated position. The speed-sensitive mechanism may be rotatable in conjunction with the rotatable hub and may be configured to transition from the non-activated position to the activated position upon a predetermined rotation speed of the rotatable hub.

In accordance with some non-limiting embodiments or aspects of the present disclosure, a self-retracting device may include a housing assembly having a first housing cover removably connectable to a second housing cover, a rotatable hub and a retraction member received within an interior of the housing assembly, and an axle having a first end fixedly but removably connected to the first housing cover and a second end in engagement with at least a portion of the rotatable hub. The rotatable hub and the retraction member may be captured between the second end of the axle and the first housing cover.

In accordance with some non-limiting embodiments or aspects of the present disclosure, the first end of the axle may be threadably connected to the first housing cover. The second end of the axle may have a shoulder configured for engaging the rotatable hub. The second end of the axle may be received within a pocket of the second housing cover when the second housing cover is connected to the first housing cover. The first end of the axle may be connected to the first housing cover by one of a threaded connection, a rivet head on a terminal end of the first end, a cap threadably connected to the first end, a locking clip connected to a recess or an opening in the first end, and a movable locking tab on the first end in engagement with a locking lip on the first housing cover.

In accordance with some embodiments or aspects, the self-retracting device may be characterized by one or more of the following clauses:

Clause 1: A self-retracting device comprising: a housing assembly comprising a first housing cover removably connectable to a second housing cover; a rotatable hub received within an interior of the housing assembly and having a line associated therewith; a retraction member received within the interior of the housing assembly between the rotatable hub and the first housing cover; and an axle having a first end fixedly but removably connected to the first housing cover, a body extending through the retraction member and the rotatable hub, and a second end in engagement with at least a portion of the rotatable hub.

Clause 2: The self-retracting device according to clause 1, wherein the axle has first threads at the first end configured for threadably engaging with second threads on the first housing cover.

Clause 3: The self-retracting device according to clause 1 or 2, wherein the second threads are defined on an insert non-removably connected to the first housing cover.

Clause 4: The self-retracting device according to any of clauses 1-3, wherein the second end of the axle has a bolt head configured for interfacing with a fastening tool.

Clause 5: The self-retracting device according to any of clauses 1-4, wherein the first end and the second end of the axle are contained within the interior of the housing assembly when the first housing cover is connected to the second housing cover.

Clause 6: The self-retracting device according to any of clauses 1-5, wherein the second end of the axle is received within a pocket of the second housing cover when the second housing cover is connected to the first housing cover.

Clause 7: The self-retracting device according to any of clauses 1-6, wherein the first housing cover is removably connectable to the second housing cover by one or more fasteners, clips, adhesive, or any combination thereof.

Clause 8: The self-retracting device according to any of clauses 1-7, wherein the line has a first end directly or indirectly attached to the rotatable hub and a second end opposite the first end and extending out of the housing assembly.

Clause 9: The self-retracting device according to any of clauses 1-8, wherein the retraction member biases the rotatable hub in a first rotational direction.

Clause 10: The self-retracting device according to any of clauses 1-9, wherein the rotatable hub is configured to: (i) retract the line into the interior of the housing assembly by winding the line onto the rotatable hub when the rotatable hub moves in the first rotational direction; and (ii) pay out the line from the interior of the housing by unwinding from the rotatable hub when the rotatable hub moves in a second rotational direction opposite the first rotational direction.

Clause 11: The self-retracting device according to any of clauses 1-10, wherein the retraction member is a power spring.

Clause 12: The self-retracting device according to any of clauses 1-11, wherein the power spring comprises a first end fixed relative to the housing assembly and a second end secured directly or indirectly to the rotatable hub.

Clause 13: The self-retracting device according to any of clauses 1-12, further comprising a brake assembly configured to prevent rotation of the rotatable hub upon activation of the brake assembly.

Clause 14: The self-retracting device according to any of clauses 1-13, wherein the brake assembly comprises a speed-sensitive mechanism having an activated position and a non-activated position.

Clause 15: The self-retracting device according to any of clauses 1-14, wherein the speed-sensitive mechanism is rotatable in conjunction with the rotatable hub and is configured to transition from the non-activated position to the activated position upon a predetermined rotation speed of the rotatable hub.

Clause 16: A self-retracting device comprising: a housing assembly comprising a first housing cover removably connectable to a second housing cover; a rotatable hub and a retraction member received within an interior of the housing assembly; and an axle having a first end fixedly but removably connected to the first housing cover and a second end in engagement with at least a portion of the rotatable hub, wherein the rotatable hub and the retraction member are captured between the second end of the axle and the first housing cover.

Clause 17: The self-retracting device according to clause 16, wherein the first end of the axle is threadably connected to the first housing cover.

Clause 18: The self-retracting device according to clause 16 or 17, wherein the second end of the axle has a shoulder configured for engaging the rotatable hub.

Clause 19: The self-retracting device according to any of clauses 16-18, wherein the second end of the axle is received within a pocket of the second housing cover when the second housing cover is connected to the first housing cover.

Clause 20: The self-retracting device according to any of clauses 16-19, wherein the first end of the axle is connected to the first housing cover by one of a threaded connection, a rivet head on a terminal end of the first end, a cap threadably connected to the first end, a locking clip connected to a recess or an opening in the first end, and a movable locking tab on the first end in engagement with a locking lip on the first housing cover.

These and other features and characteristics of the present disclosure, as well as the methods of operation and functions of the related elements and structures, and the combination of parts, and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

In FIGS. 1-5F the same reference numbers represent the same components unless otherwise indicated.

DETAILED DESCRIPTION OF THE DISCLOSURE

Figure 1:
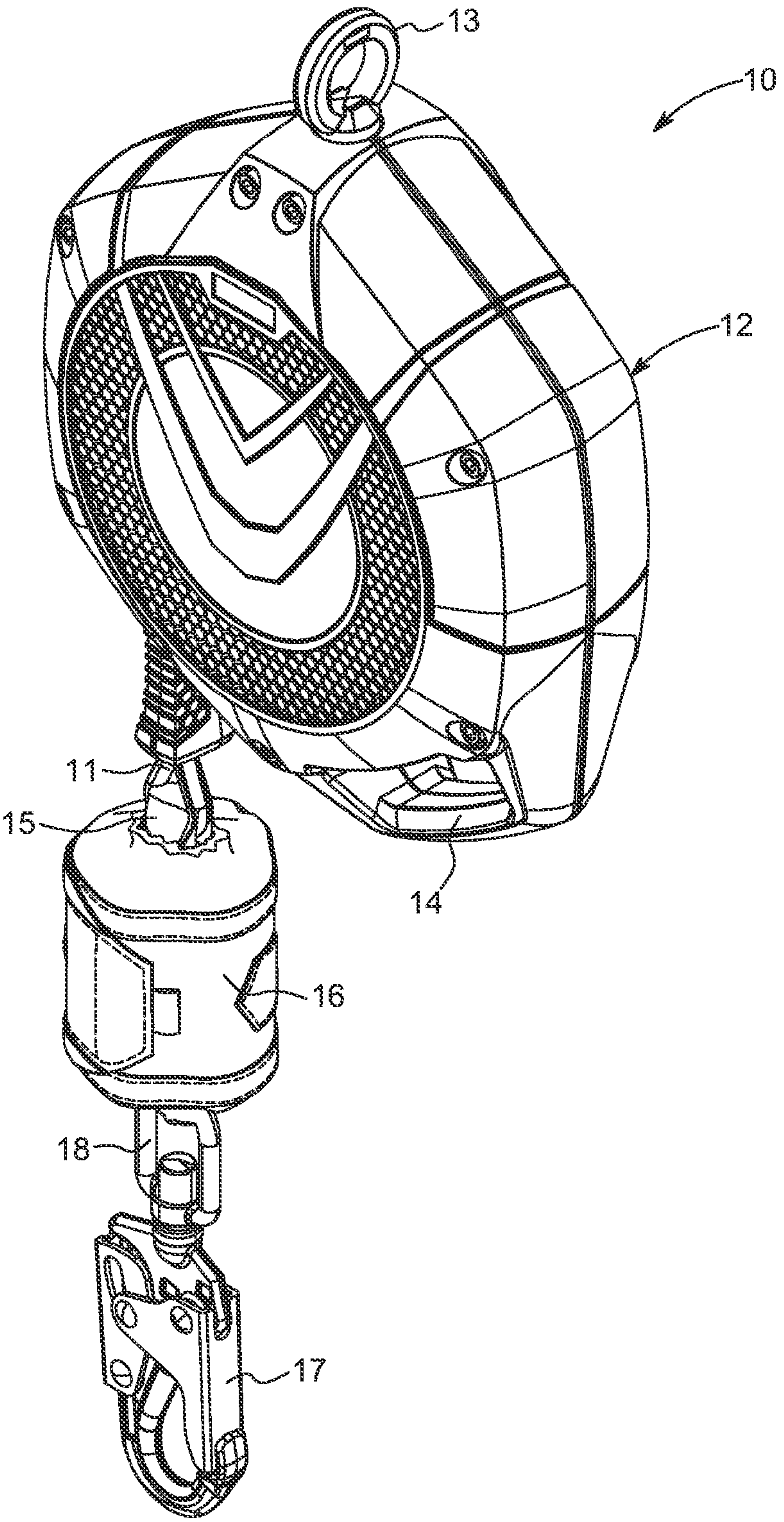
FIG. 1 is an isometric perspective view of a self-retracting device according to some non-limiting embodiments or aspects of the present disclosure.

As used herein, the singular form of “a”, “an”, and “the” include plural referents unless the context clearly dictates otherwise.

Spatial or directional terms, such as “left”, “right”, “inner”, “outer”, “above”, “below”, and the like, relate to the embodiments or aspects as shown in the drawing figures and are not to be considered as limiting as the embodiments or aspects can assume various alternative orientations.

All numbers used in the specification and claims are to be understood as being modified in all instances by the term “about”. By “about” is meant within plus or minus twenty-five percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of “1 to 10” should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms “first”, “second”, and the like are not intended to refer to any particular order or chronology, but refer to different conditions, properties, or elements.

All documents referred to herein are “incorporated by reference” in their entirety.

The term “at least” is synonymous with “greater than or equal to”.

As used herein, “at least one of” is synonymous with “one or more of”. For example, the phrase “at least one of A, B, or C” means any one of A, B, or C, or any combination of any two or more of A, B, or C. For example, “at least one of A, B, and C” includes A alone; or B alone; or C alone; or A and B; or A and C; or B and C; or all of A, B, and C.

The term “includes” is synonymous with “comprises”.

As used herein, the terms “parallel” or “substantially parallel” mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms “perpendicular” or “substantially perpendicular” mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of various examples or aspects may describe certain features as being “particularly” or “preferably” within certain limitations (e.g., “preferably”, “more preferably”, or “even more preferably”, within certain limitations). It is to be understood that the disclosure is not limited to these particular or preferred limitations but encompasses the entire scope of the various examples and aspects described herein.

The disclosure comprises, consists of, or consists essentially of, the following examples or aspects, in any combination. Various examples or aspects of the disclosure are illustrated in separate drawing figures. However, it is to be understood that this is simply for ease of illustration and discussion. In the practice of the disclosure, one or more examples or aspects shown in one drawing figure can be combined with one or more examples or aspects shown in one or more of the other drawing figures.

As illustrated in FIG. 1, certain preferred and non-limiting embodiments or aspects of a self-retracting device 10 for use in industrial environments and recreational activities are provided. The self-retracting device 10 can be implemented in any appropriate application or environment where a user or worker engages in activities in an elevated position and requires some protection in the event of a fall. Further, in some non-limiting embodiments or aspects, the self-retracting device 10 of the present disclosure is in the form of a fall protection device or lanyard, such as a self-retracting lanyard. The self-retracting device 10 is configured to protect the user should an unintentional, accidental fall commence. The self-retracting device 10 is configured to prevent the user from falling too far or stopping too quickly, as discussed in detail herein.

With continued reference to FIG. 1, the self-retracting device 10 has a housing 12 that encloses various components configured for paying out a line 11 from the housing 12 and retracting the line 11 into the housing. The housing 12 has a connector 13 for connecting the self-retracting device 10 to a fixed anchor point, such as a floor, wall, railing, or the like. In some non-limiting embodiments or aspects, the connector 13 may be a ring configured for receiving a connection element that is connected to the fixed anchor point. The housing 12 may have a handle 14 to facilitate carrying of the self-retracting device 10 while not in use. In some non-limiting embodiments or aspects, the handle 14 may also function as an auxiliary attachment point for connecting the self-retracting device 10 to an anchor point.

With continued reference to FIG. 1, the line 11 may be connected to a first end 15 of an energy absorber 16 configured to deploy in an event of an accidental fall in order to safely arrest the fall of the user. The energy absorber 16 may be self-deployable when the line 11 is exposed to a tension exceeding a predetermined threshold. A hook 17 is connected to a second end 18 of the energy absorber 16. The hook 17 is configured for removably connecting to a safety harness worn by the user. For example, the hook 17 may be removably connectable to a D-ring on a dorsal portion of the safety harness.

Figure 2:
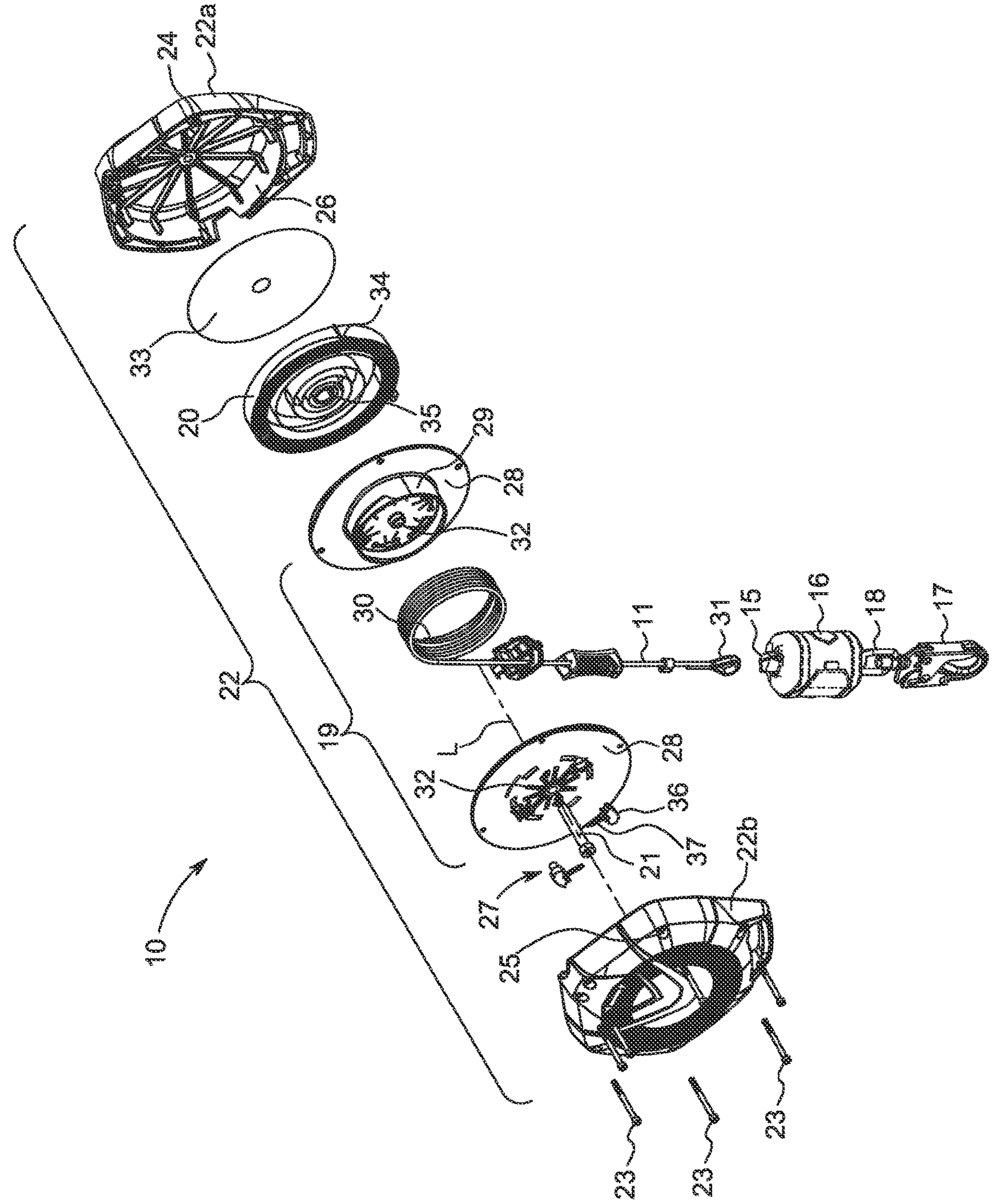
FIG. 2 is an exploded isometric perspective view of the self-retracting device shown in FIG. 1.

With reference to FIG. 2, and in some non-limiting embodiments or aspects, the self-retracting device 10 includes a hub 19 having the line 11 wound thereon. The self-retracting device 10 further includes a retraction member 20 biasing the hub 19 in a first rotational direction of the hub 19, and an axle 21 about which the hub 19 and the retraction member 20 rotate. The hub 19 is configured to (i) retract the line 11 when the hub 19 moves in the first rotational direction and (ii) payout the line 11 when the hub 19 moves in a second rotational direction opposite to the first rotational direction. In some non-limiting embodiments or aspects, the first rotational direction may be a counter-clockwise direction about a longitudinal axis L of the axle 21, and the second rotational direction may be a clockwise direction about the axle 21. In further non-limiting embodiments or aspects, the first rotational direction may be a clockwise direction about the axle 21, and the second rotational direction may be a counter-clockwise direction about the axle 21.

With continued reference to FIG. 2, the self-retracting device 10 includes a housing assembly 22 having a first housing cover 22*a* and a second housing cover 22*b*. The first and second housing covers 22*a*, 22*b* define the housing 12 (shown in FIG. 1). In some non-limiting embodiments or aspects, the first housing cover 22*a* and the second housing cover 22*b* may be removably connectable to each other. In some non-limiting embodiments or aspects, one or more fasteners 23 may be provided for removably connecting the first housing cover 22*a* to the second housing cover 22*b*. The one or more fasteners 23 may be disposed about an outer perimeter of the housing assembly 22. Each of the one or more fasteners 23 may be configured to threadably engage a threaded hole 24 in one of the first housing cover 22*a* and the second housing cover 22*b* and extend through a through hole 25 on the other of the first housing cover 22*a* and the second housing cover 22*b*. In some embodiments or aspects, the first housing cover 22*a* and the second housing cover 22*b* may be removably connectable to each other by way of clips, adhesive, fasteners, or any combination thereof.

With continued reference to FIG. 2, the housing assembly 22 defines an interior cavity 26 that receives the components of the self-retracting device 10. For example, the interior cavity 26 may be defined between the first housing cover 22*a* and the second housing cover 22*b*. In some non-limiting embodiments or aspects, the interior cavity 26 of the housing assembly 22 is configured to receive the hub 19, the axle 21, a brake assembly 27, and the retraction member 20. The axle 21 may be at least partially supported by the housing assembly 22 and extends between the first and second housing covers 22*a*, 22*b*.

As shown in FIG. 2, the hub 19 has a body 28 defining a recessed portion 29 that receives the line 11. The line 11 is wound about the recessed portion 29 and includes a first end 30 attached to the hub 19 and a second, free end 31 positioned opposite the first end 30. The second end 31 of the line 11 is configured for connecting to the first end 15 of the energy absorber 16. The body 28 of the hub 19 includes an opening 32 that receives the axle 21. In some embodiments or aspects, the opening 32 extends through a center of the body 28 of the hub 19. The hub 19 is rotatable within the housing assembly 22 and is configured to pay out or retract the line 11 from and into the housing assembly 22 as the hub 19 is rotated within the housing assembly 22 about the longitudinal axis L of the axle 21.

With continued reference to FIG. 2, the retraction member 20 is received within the interior cavity 26 of the housing assembly 22 and is configured to bias the hub 19 in the first rotational direction. In some non-limiting embodiments or aspects, the retraction member 20 is positioned between the hub 19 and the first housing cover 22*a*. A noise reducer pad 33 may be positioned between the retraction member 20 and the first housing cover 22*a* to absorb noise and vibration that may otherwise be caused due to contact between the retraction member 20 and the first housing cover 22*a*. The retraction member 20 is configured to (i) retract the line 11 when the hub 19 moves in the first rotational direction due to release of potential energy stored in the retraction member 20 and (ii) pay out the line 11 when the hub 19 moves in the second rotational direction opposite to the first rotational direction due to an outside force. Movement of the hub 19 in the second rotational direction builds potential energy in the retraction member 20. This potential energy may be released when the outside force is removed in order to retract the line 11 into the housing assembly 22 by winding the line 11 on the hub 19. In some non-limiting embodiments or aspects, the retraction member 20 may be a power spring having a first end 34 fixed relative to the housing assembly 22, such as the first housing cover 22*a*, and a second end 35 secured directly or indirectly to the rotatable hub 19. In this manner, rotation of the hub 19 in the second direction during payout of the line 11 from the housing assembly 22 builds potential energy in the power spring which is then used to rotate the hub 19 in the first direction to retract the line 11 into the housing assembly 22 when tension on the line 11 is unloaded.

With continued reference to FIG. 2, the self-retracting device 10 may have the brake assembly 27 that is configured to prevent rotation of the hub 19 upon activation of the brake assembly 27. The brake assembly 27 is disposed in the interior cavity 26 of the housing assembly 22 and includes a speed-sensitive mechanism 36 having an activated position and a non-activated position. The speed-sensitive mechanism 36 is connected to the hub 19 and is rotatable with the hub 19. In some non-limiting embodiments or aspects, the speed-sensitive mechanism 36 of the brake assembly 27 may include one or more pawls that are biased to a first position by a biasing member 37, such as a spring.

The speed-sensitive mechanism 36 is configured to transition from the non-activated position to the activated position at a predetermined rotational speed of the hub 19. The predetermined rotational speed of the hub 19 at which the speed-sensitive mechanism 36 is transitioned from the non-activated position to the activation position is selected to correspond to a rotational speed that would be indicative of a fall event. As the line 11 is paid out from the hub 19, the hub 19 and speed-sensitive mechanism 36 rotate until the hub 19 and the speed-sensitive mechanism 36 reach the predetermined rotational speed. The biasing force on the one or more pawls of the speed-sensitive mechanism 36 due to the biasing member 37 is overcome by a centripetal force when the rotational speed of the hub 19 exceeds a predetermined threshold, at which the one or more pawls transition to a second position configured for engagement with one or more teeth on the housing assembly 22, such as the second housing portion 22*b*. Upon engagement of the speed-sensitive mechanism 36 with the housing assembly 22, the payout of the line 11 is stopped to arrest further movement of the user that is connected to the line 11.

Figure 3:
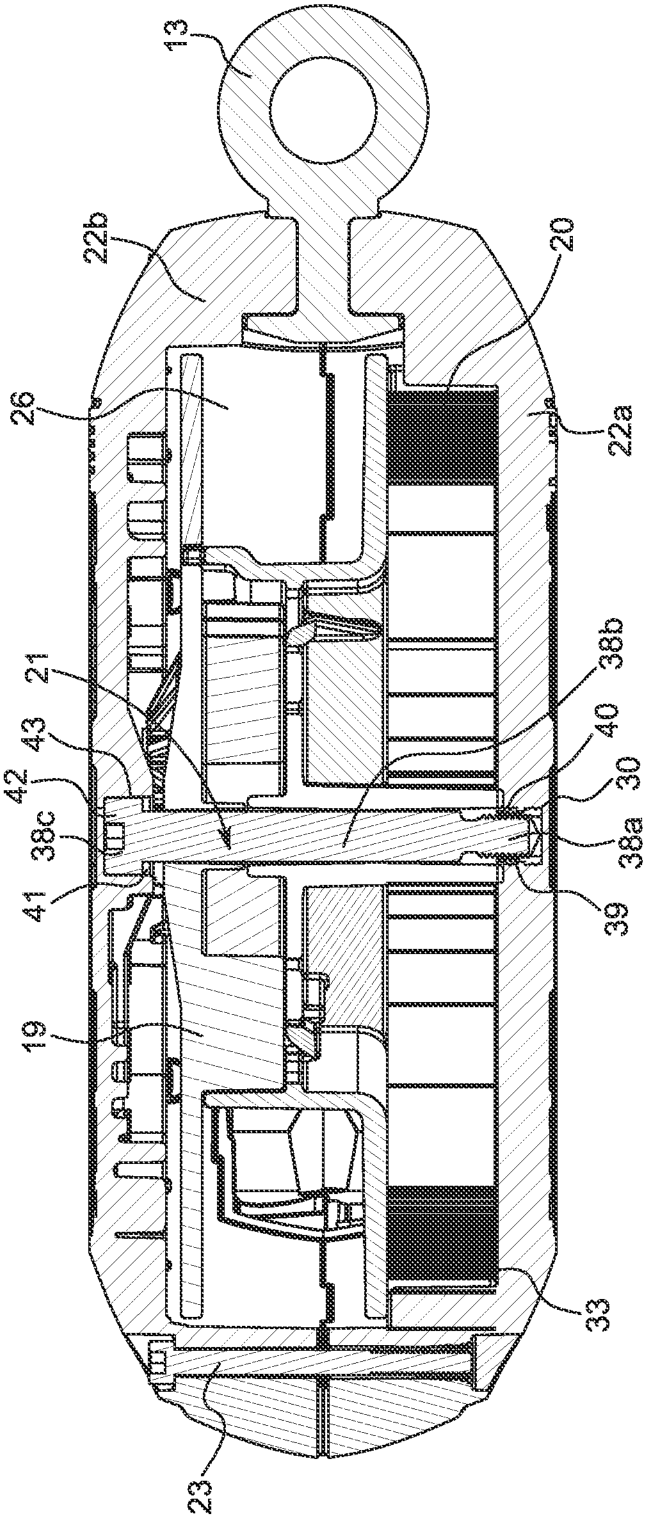
FIG. 3 is a cross-sectional view of the self-retracting device shown in FIG. 1.

With reference to FIG. 3, the axle 21 has a first end 38*a* fixedly but removably connected to the first housing cover 22*a*, a body 38*b* extending through the retraction member 20 and the hub 19, and a second end 38*c* received within a pocket 43 on the second housing cover 22*b*. As used herein, the phrase “fixedly but removably connected” means that the axle 21 is fixed to the first housing cover 22*a* such that the retraction member 20 and the hub 19 are retained between the second end 38*c* of the axle 21 and the first housing cover 22*a*, but the axle 21 can be removed from the first housing cover 22*a*, such as by using a fastening tool. The first end 38*a* of the axle 21 has first threads 39 configured for engaging with second threads 40 on the first housing cover 22*a*. In this manner, the axle 21 is fixedly connected relative to the first housing cover 22*a*, but the axle 21 can be removed from the first housing cover 22*a* by unthreading the first threads 39 of the axle 21 from the second threads 40 of the first housing cover 22*a*. For example, the axle 21 may be connected to the first housing cover 22*a* such that it cannot rotate and/or translate relative to the first housing cover 22*a* when the first and second threads 39, 40 are in threaded engagement. Because the body 38*b* of the axle 21 extends through the hub 19 and the retraction member 20, the second end 38*c* of the axle 21 retains the hub 19 and the retraction member 20 connected to the first housing cover 22*a*. In some non-limiting embodiments or aspects, the first housing cover 22*a* may have an insert 30 that is non-removably connected to the first housing cover 22*a*. The insert 30 may have the second threads 40, and may be integrally formed with the first housing cover 22*a*. The first end 38*a* of the axle 21 may be contained entirely within the interior cavity 26 of the housing assembly 22 such that the axle 21 is not visible and/or accessible from outside the housing assembly 22.

Figure 4:
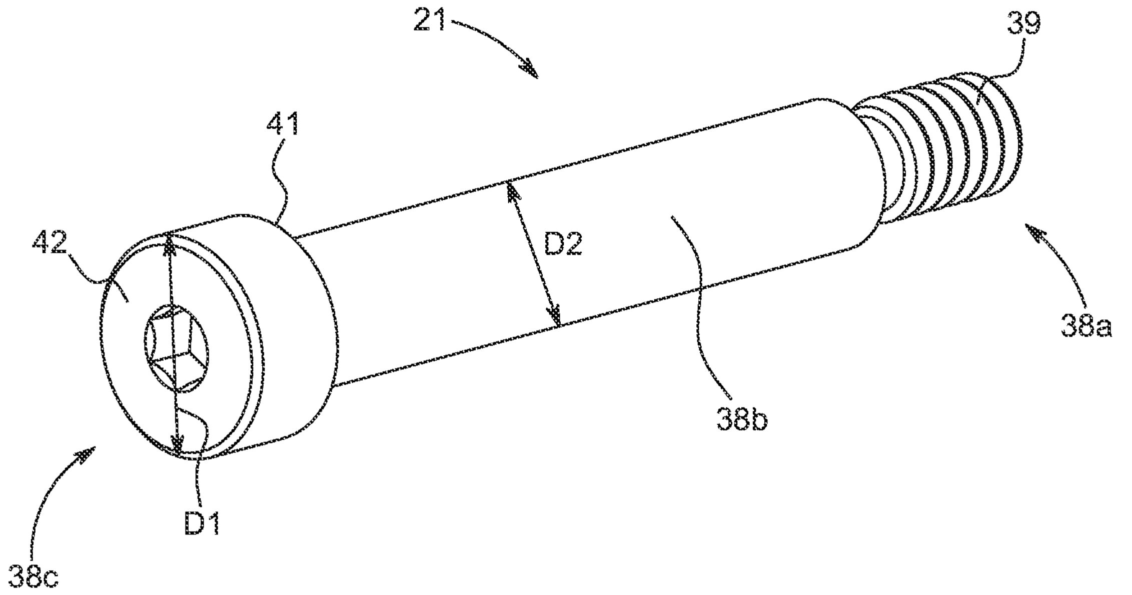
FIG. 4 is an isometric perspective view of a shoulder bolt axle.

With continued reference to FIG. 3, the second end 38*c* of the axle 21 has a shoulder 41 (shown in FIG. 4) that is configured to engage the body 28 of the hub 19. The shoulder 41 has a larger outer diameter D1 than an outer diameter D2 of the body 38*b* of the axle 21 (see FIG. 4). In some non-limiting embodiments or aspects, the shoulder 41 may be configured to contact at least a portion of the hub 19. In this manner, when the first end 38*a* of the axle 21 is connected to the first housing cover 22*a*, the hub 19 and the retraction member 20 are captured between the second end 38*c* of the axle 21 (i.e., the shoulder 41) and the first housing cover 22*a*. Thus, if the second housing cover 22*b* is removed from the first housing cover 22*a*, such as by removing the fasteners 23, the hub 19 and the retraction member 20 stay connected to the first housing cover 22*a* by way of the axle 21. This prevents accidental unraveling of the retraction member 20 when the second housing cover 22*b* is removed.

With continued reference to FIG. 3, the second end 38*c* of the axle 21 may define a head 42 (also shown in FIG. 4) configured for interfacing with a fastening tool, such as a wrench or a socket. In this manner, the axle 21 may be connected to and disconnected from the first housing cover 22*a* using the fastening tool on the head 42 of the axle 21. The head 42 is sized to be received within the pocket 43 on the second housing cover 12*b*. In this manner, the second end 38*c* of the axle 21 may be contained entirely within the interior cavity 26 of the housing assembly 22 such that the axle 21 is not visible and/or accessible from outside of the interior cavity 26.

FIGS. 5A-5F show various alternative non-limiting embodiments or aspects for connecting the hub 19 and the retraction member 20 to the first housing cover 22*a* via the axle 21.

Figure 5A:
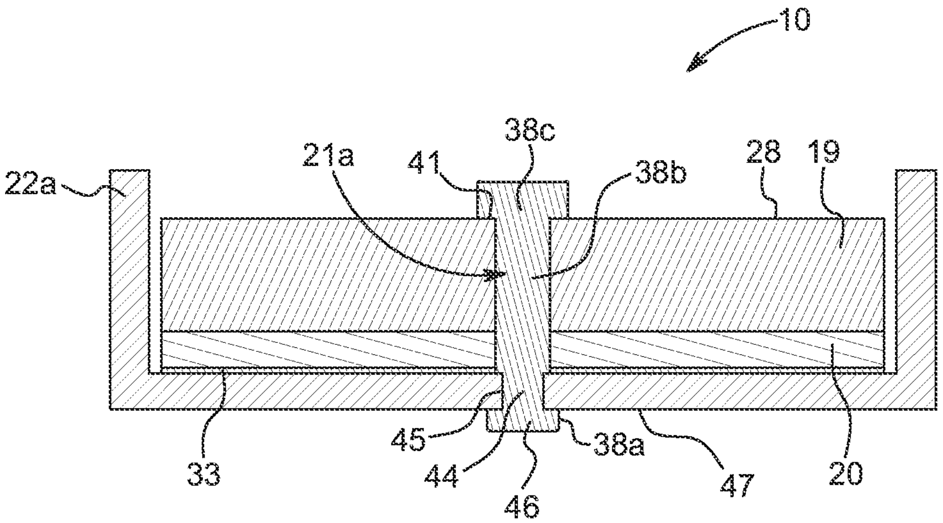
FIGS. 5A-5F are schematic, side cross-sectional views of a self-retracting device according to some non-limiting embodiments or aspects of the present disclosure.

With reference to FIG. 5A, the axle 21*a* has a first end 38*a* fixedly and non-removably connected to the first housing cover 22*a*, a body 38*b* extending through the retraction member 20, the noise reducer pad 33, and the hub 19, and a second end 38*c* configured for engaging an outer surface of the body of the hub 19, such as via the shoulder 41. In some non-limiting embodiments or aspects, the first end 38*a* of the axle 21*a* may be riveted to the first housing cover 22*a*. For example, the first end 38*a* may have a rivet body 44 that is configured to extend through an opening 45 on the first housing cover 22*a* and a rivet head 46 at a terminal end of the rivet body 44. The rivet head 46 is positioned outside the interior of the first housing cover 22*a* and is configured for engaging an outer surface 47 of the first housing cover 22*a*. An outer diameter of the rivet head 46 is larger than an outer diameter of the rivet body 44 and an inner diameter of the opening 45 such that the rivet head 46 cannot pass through the opening 45 once the axle 21*a* is installed. In this manner, the axle 21*a* is fixedly and non-removably connected to the first housing cover 22*a*. In other words, once the axle 21*a* is connected to the first housing cover 22*a*, the axle 22*a* is not intended to be removed from the first housing cover 22*a* without physically destroying at least one of the axle 21*a* and the first housing cover 22*a*. In some embodiments or aspects, the rivet head 46 may be formed on the first housing cover 22*a* such that it captures and retains the rivet body 44 of the axle 21*a*. In this manner, the axle 21*a* is fixedly but removably connected relative to the first housing cover 22*a* such that the axle 21*a* cannot rotate or translate relative to the first housing cover 22*a*. Because the body 38*b* of the axle 21*a* extends through the hub 19, the retraction member 20, and the noise reducer pad 33, the second end 38*c* of the axle 21*a* retains the hub 19, the retraction member 20, and the noise reducer pad 33 on the first housing cover 22*a*.

Figure 5B:
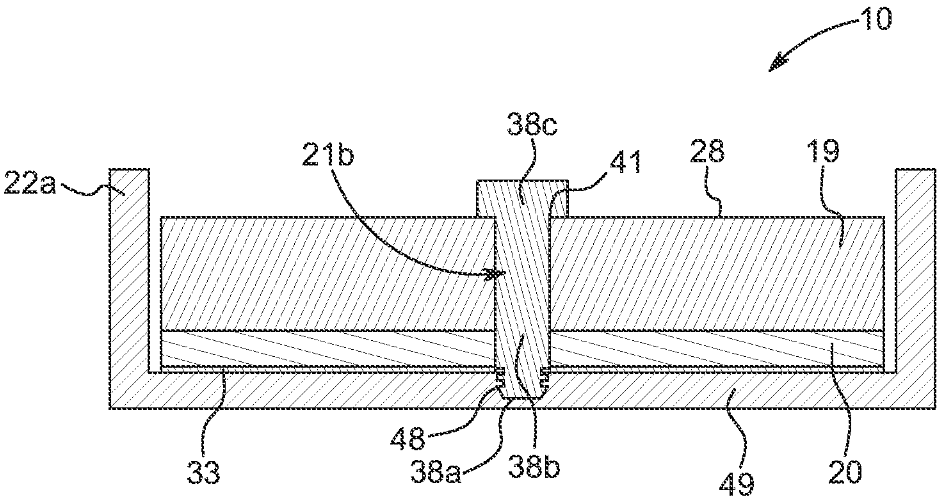

With reference to FIG. 5B, the axle 21*b* has a first end 38*a* fixedly but removably connected to the first housing cover 22*a*, a body 38*b* extending through the retraction member 20, the noise reducer pad 33, and the hub 19, and a second end 38*c* configured for engaging an outer surface of the body of the hub 19, such as via the shoulder 41. In some non-limiting embodiments or aspects, the first end 38*a* of the axle 21*a* may have self-taping threads 48 configured for threading into a sidewall 49 of the first housing cover 22*a*. In this manner, the axle 21*b* can be fixedly but removably connected relative to the first housing cover 22*a* such that the axle 21*b* cannot rotate or translate relative to the first housing cover 22*a*. Because the body 38*b* of the axle 21*b* extends through the hub 19, the retraction member 20, and the noise reducer pad 33, the second end 38*c* of the axle 21*b* retains the hub 19, the retraction member 20, and the noise reducer pad 33 on the first housing cover 22*a*.

Figure 5C:
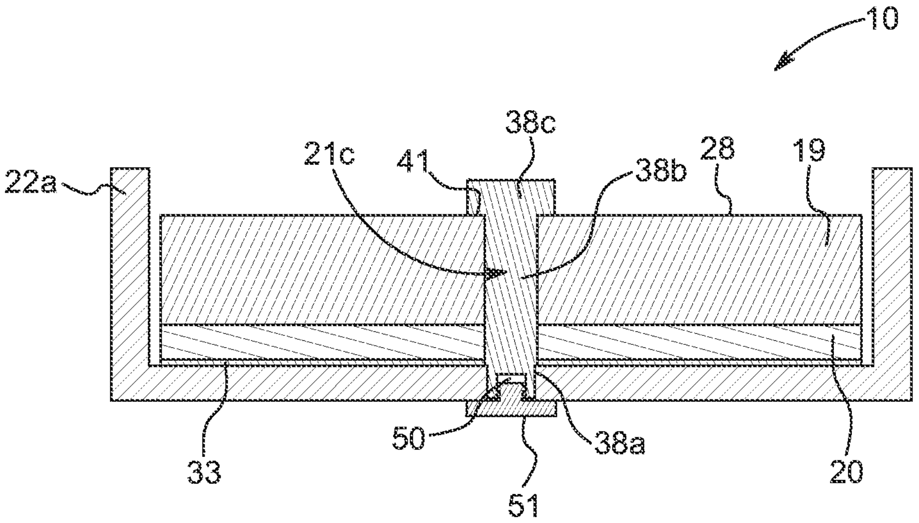

With reference to FIG. 5C, the axle 21*c* has a first end 38*a* fixedly but removably connected to the first housing cover 22*a*, a body 38*b* extending through the retraction member 20, the hub 19, and the noise reducer pad 33. The axle 21*c* also has a second end 38*c* configured for engaging an outer surface of the body of the hub 19, such as via the shoulder 41. In some non-limiting embodiments or aspects, the first end 38*a* of the axle 21*c* may have a receiver 50 having female threads that are configured for threadably engaging a cap 51. The first end 38*a* may be configured to extend through an opening 45 on the first housing cover 22*a*. The cap 51 is external to the first housing cover 22*a* and is configured to threadably connect to the receiver 50 at the first end 38*a* of the axle 21*c*. In this manner, the axle 21*c* can be fixedly but removably connected relative to the first housing cover 22*a* such that the axle 21*c* cannot rotate or translate relative to the first housing cover 22*a*. Because the body 38*b* of the axle 21*c* extends through the hub 19, the retraction member 20, and the noise reducer pad 33, the second end 38*c* of the axle 21*c* retains the hub 19, the retraction member 20, and the noise reducer pad 33 on the first housing cover 22*a*.

Figure 5D:
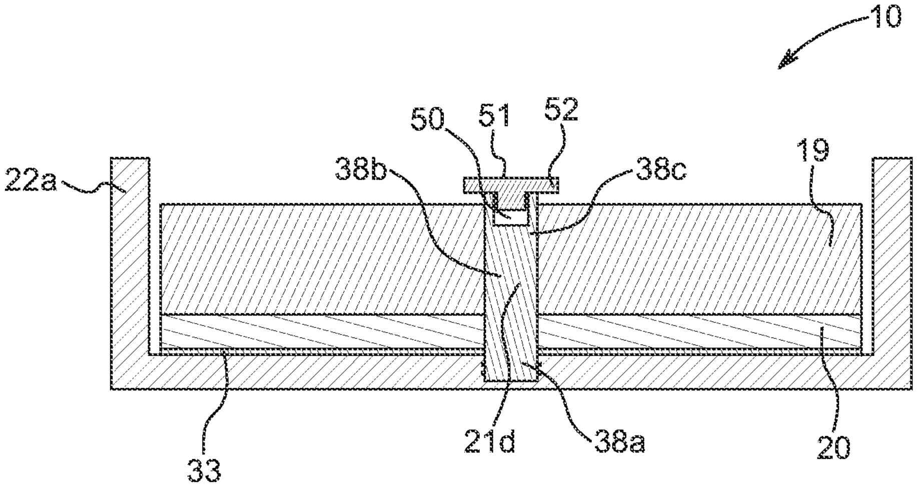

With reference to FIG. 5D, the axle 21*d* has a first end 38*a* fixedly and non-removably connected to the first housing cover 22*a*, a body 38*b* extending through the retraction member 20, the hub 19, and the noise reducer pad 33. The axle 21*d* also has a second end 38*c* configured for engaging an outer surface of the body of the hub 19. In some non-limiting embodiments or aspects, the first end 38*a* of the axle 21*c* may be fixedly and non-removably connected to the first housing cover 22*a*. The second end 38*c* may have a receiver 50 having male or female threads that are configured for threadably engaging corresponding threads on a cap 51. The cap 51 defines a shoulder 52 for engaging an outer surface of the body 28 of the hub 19. In this manner, the axle 21*d* can be fixedly and non-removably connected relative to the first housing cover 22*a* such that the axle 21*d* cannot rotate or translate relative to the first housing cover 22*a*. In other words, once the axle 21*d* is connected to the first housing cover 22*a*, the axle 21*d* is not intended to be removed from the first housing cover 22*a* without physically destroying at least one of the axle 21*d* and the first housing cover 22*a*. Because the body 38*b* of the axle 21*d* extends through the hub 19, the retraction member 20, and the noise reducer pad 33, the second end 38*c* of the axle 21*c* retains the hub 19, the retraction member 20, and the noise reducer pad 33 on the first housing cover 22*a*.

Figure 5E:
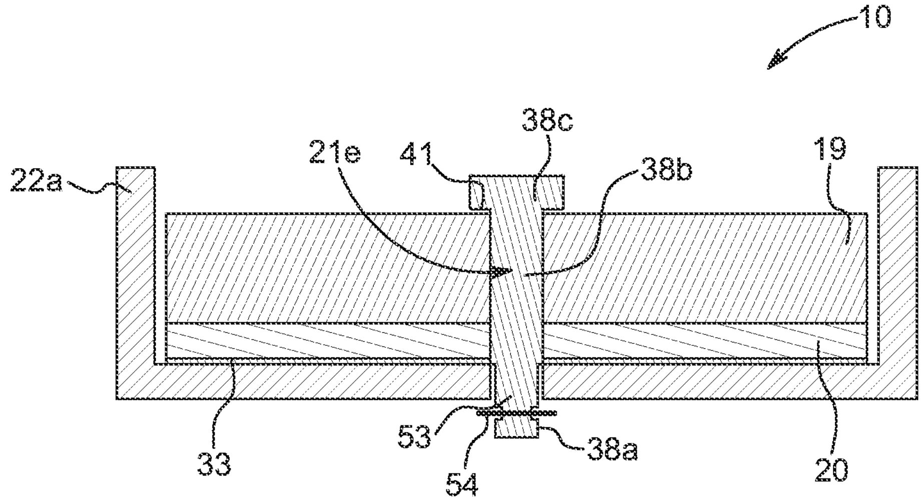

With reference to FIG. 5E, the axle 21*e* has a first end 38*a* fixedly but removably connected to the first housing cover 22*a*, a body 38*b* extending through the retraction member 20, the hub 19, and the noise reducer pad 33. The axle 21*e* also has a second end 38*c* configured for engaging an outer surface of the body of the hub 19, such as via the shoulder 41. In some non-limiting embodiments or aspects, the first end 38*a* of the axle 21*e* extends through an opening 45 in the first housing cover 22*a*. The first end 38*a* has a recess 53 or an opening configured for engaging a locking clip 54. In some non-limiting embodiments or aspects, the locking clip 54 may be a snap ring, a retaining ring, a circlip, or other captive hardware. The locking lip 54, when connected to the first end 38*a* of the axle 21*e*, prevents removal of the axle 21*e* from the first housing cover 22*a*. The second end 38*c* has the shoulder 41 for engaging the outer surface of the body of the hub 19. In this manner, the axle 21*e* can be fixedly but removably connected relative to the first housing cover 22*a* such that the axle 21*e* cannot rotate or translate relative to the first housing cover 22*a*. Because the body 38*b* of the axle 21*e* extends through the hub 19, the retraction member 20, and the noise reducer pad 33, the second end 38*c* of the axle 21*e* retains the hub 19, the retraction member 20, and the noise reducer pad 33 on the first housing cover 22*a*.

Figure 5F:
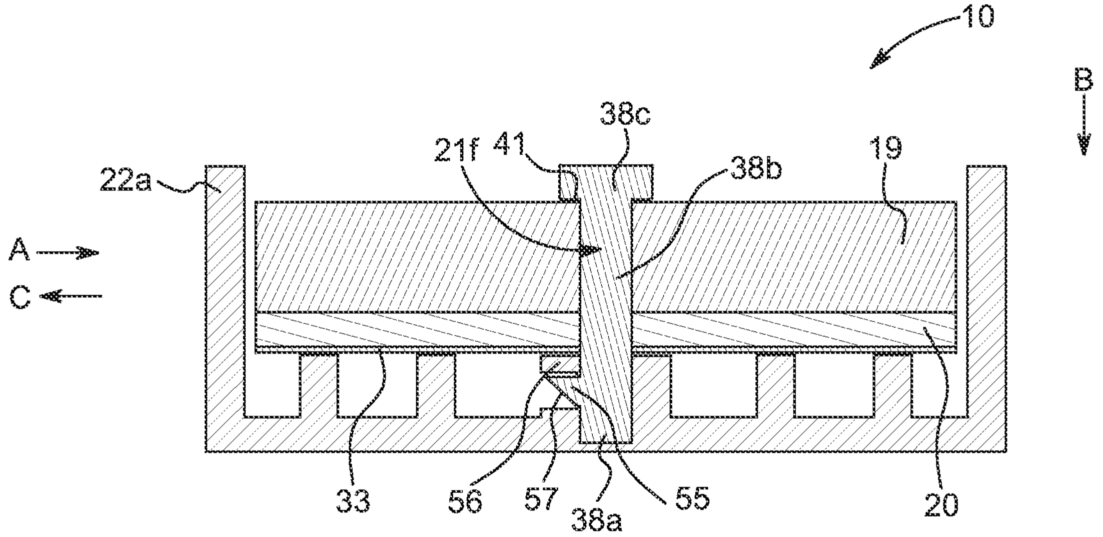

With reference to FIG. 5F, the axle 21*f* has a first end 38*a* fixedly but removably connected to the first housing cover 22*a*, a body 38*b* extending through the retraction member 20, the hub 19, and the noise reducer pad 33. The axle 21*f* also has a second end 38*c* configured for engaging an outer surface of the body of the hub 19, such as via the shoulder 41. In some non-limiting embodiments or aspects, the first end 38*a* of the axle 21*f* has a locking tab 55 that is configured for being captured by a locking lip 56 on the first housing cover 22*a*. For example, the locking tab 55 may be a spring-loaded element that is movable in a radial direction relative to the axle 21*f*. A ramp 57 on the locking tab 55 may facilitate radial movement of the locking tab 55 in a radially inward direction (shown by arrow A) when the locking tab 55 contacts the locking lip 56. Once the locking tab 55 passes over the locking lip 56, such as when the axle 21*f* is urged in the direction of arrow B, the locking tab 55 may move radially outward in a direction of arrow C, such as due to a restoring force of a spring. In this manner, the locking tab 55 is captured under the locking lip 56 to prevent removal of the axle 21*f* from the first housing cover 22*a*. In this manner, the axle 21*f* can be fixedly but removably connected relative to the first housing cover 22*a* such that the axle 21*f* cannot rotate or translate relative to the first housing cover 22*a*. Because the body 38*b* of the axle 21*f* extends through the hub 19, the retraction member 20, and the noise reducer pad 33, the second end 38*c* of the axle 21*f* retains the hub 19, the retraction member 20, and the noise reducer pad 33 on the first housing cover 22*a*.

Although the present disclosure has been described in detail for the purpose of illustration based on what are currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A self-retracting device comprising:

a housing assembly comprising a first housing cover removably connectable to a second housing cover;

a rotatable hub received within an interior of the housing assembly and having a line associated therewith;

a retraction member received within the interior of the housing assembly between the rotatable hub and the first housing cover; and an axle having a first end fixedly but removably connected to the first housing cover, a body extending through the retraction member and the rotatable hub, and a second end, wherein the second end of the axle has a first diameter greater than an adjacent diameter of the body of the axle, the first diameter thereby forming a head at the second end, the head configured to engage with the rotatable hub.

2. The self-retracting device according to claim 1, wherein the axle has first threads at the first end configured for threadably engaging with second threads on the first housing cover.

3. The self-retracting device according to claim 2, wherein the second threads are defined on an insert non-removably connected to the first housing cover.

4. The self-retracting device according to claim 1, wherein the head is configured for engaging an outer surface of the rotatable hub.

5. The self-retracting device according to claim 1, wherein the axle is contained entirely within the interior of the housing assembly when the first housing cover is connected to the second housing cover such that the axle is not accessible from outside the housing assembly.

6. The self-retracting device according to claim 1, wherein the second end of the axle is received within a pocket of the second housing cover when the second housing cover is connected to the first housing cover.

7. The self-retracting device according to claim 1, wherein the first housing cover is removably connectable to the second housing cover by one or more fasteners, clips, adhesive, or any combination thereof.

8. The self-retracting device according to claim 1, wherein the line has a first end directly or indirectly connected to the rotatable hub and a second end opposite the first end and extending out of the housing assembly.

9. The self-retracting device according to claim 1, wherein the retraction member biases the rotatable hub in a first rotational direction.

10. The self-retracting device according to claim 9, wherein the rotatable hub is configured to: (i) retract the line into the interior of the housing assembly by winding the line onto the rotatable hub when the rotatable hub moves in the first rotational direction; and (ii) pay out the line from the interior of the housing assembly by unwinding from the rotatable hub when the rotatable hub moves in a second rotational direction opposite the first rotational direction.

11. The self-retracting device according to claim 1, wherein the retraction member is a power spring.

12. The self-retracting device according to claim 11, wherein the power spring comprises a first end fixed relative to the housing assembly and a second end secured directly or indirectly to the rotatable hub.

13. The self-retracting device according to claim 1, further comprising a brake assembly configured to prevent rotation of the rotatable hub upon activation of the brake assembly.

14. The self-retracting device according to claim 13, wherein the brake assembly comprises a speed-sensitive mechanism having an activated position and a non-activated position.

15. The self-retracting device according to claim 14, wherein the speed-sensitive mechanism is rotatable in conjunction with the rotatable hub and is configured to transition from the non-activated position to the activated position upon a predetermined rotation speed of the rotatable hub.

16. A self-retracting device comprising:

a housing assembly comprising a first housing cover removably connectable to a second housing cover;

a rotatable hub and a retraction member received within an interior of the housing assembly; and an axle having a first end fixedly but removably connected to the first housing cover and a second end, wherein the second end of the axle has a first diameter greater than an adjacent diameter of the body of the axle, the adjacent diameter located within the retraction member or the rotatable hub; the first diameter thereby forming a head at the second end, the head configured to engage with the rotatable hub, wherein the rotatable hub and the retraction member are captured between the second end of the axle and the first housing cover.

17. The self-retracting device according to claim 16, wherein the first end of the axle is threadably connected to the first housing cover.

18. The self-retracting device according to claim 16, wherein the head is configured for engaging an outer surface of the rotatable hub.

19. The self-retracting device according to claim 16, wherein the second end of the axle is received within a pocket of the second housing cover when the second housing cover is connected to the first housing cover.

20. The self-retracting device according to claim 16, wherein the first end of the axle is connected to the first housing cover by one of a locking clip connected to a recess or an opening in the first end or a movable locking tab on the first end in engagement with a locking lip on the first housing cover.

21. The self-retracting device according to claim 1, wherein the first end protrudes from one side of the rotatable hub, and the second end protrudes from an opposite side of the rotatable hub.

* * * * *